March 14, 1939.  E. W. SWANSON  2,150,662
SYNCHRONOUS MOTOR CONTROL SYSTEM
Filed Aug. 16, 1937
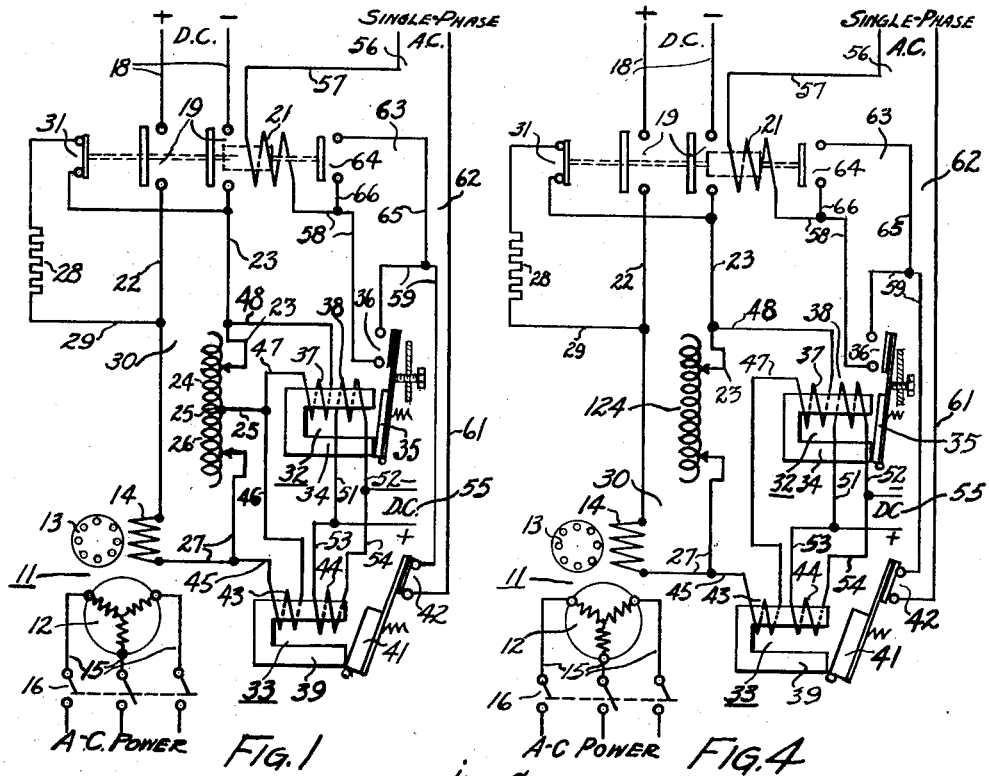
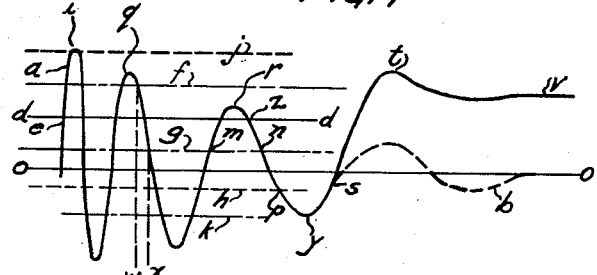
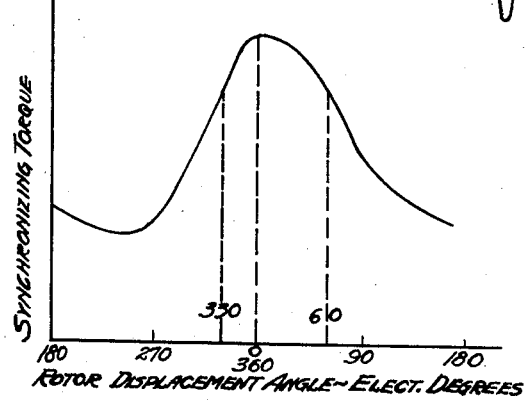
INVENTOR.
EDWIN W. SWANSON
BY Akel C. Benson
HIS ATTORNEY Patented Mar. 14, 1939

2,150,662

UNITED STATES PATENT OFFICE 2,150,662

SYNCHRONOUS MOTOR CONTROL SYSTEM

Edwin W. Swanson, Hopkins, Minn., assignor to Electric Machinery Mfg. Company, Minneapolis, Minn.

Application August 16, 1937, Serial No. 159,361

13 Claims. (Cl. 171—118)

My invention relates to synchronous motor control systems and particularly to systems for controlling the excitation of the field winding of a synchronous motor.

An object of the invention resides in providing a system by means of which the synchronizing torque of the motor is increased.

Another object of the invention resides in connecting the field winding of the motor to the source of field excitation when the frequency of the induced field current reaches predetermined values and when the torque produced thereby and the torque to be produced by applying the field excitation would be cumulative.

A still further object of the invention resides in providing a system in which the field winding is disconnected from the source of excitation whenever the motor pulls out of synchronous operation, and in which the connection of the field winding to the source of excitation is automatically reestablished whenever conditions become proper for resynchronizing.

Another object of the invention resides in providing system which can be accurately adjusted.

A still further object of the invention resides in providing an improved system for connecting the motor field winding to a source of excitation when the stator magnetic poles and rotor magnetic poles have any desired electrical angular relation.

Another object of the invention resides in providing a system which will repeatedly operate in the same manner.

Other objects of the invention reside in the novel combination of parts and in the details of construction hereinafter illustrated and/or described.

In the drawing:

Fig. 1 is a wiring diagram illustrating an embodiment of my invention.

Fig. 2 is a diagram showing the resulting synchronizing torque when the field excitation is applied at various rotor displacement angles.

Fig. 3 is a diagram of the field current before, during, and after applying excitation to the motor field winding.

Fig. 4 is a wiring diagram of a modification of the invention.

With systems heretofore used for synchronizing synchronous motors, no adjustment of the operation of the devices used in the systems could be made and field excitation could not be applied at a desired instant and in most cases, excitation was not applied at such an instant as would result in obtaining the greatest synchronizing torque. The present invention overcomes this disadvantage by providing a system in which adjustment of the parts may be utilized to apply field excitation at any predetermined instant of time and particularly at such time as will produce the greatest synchronizing torque, and in which the excitation is always applied at the same rotor displacement angle.

In the form of the invention disclosed in Fig. 1 I have shown a synchronous motor 11 which is of the self-starting type. This motor includes an armature winding 12 which in this case is a three-phase winding and which with the particular type of motor illustrated happens to be disposed on the stator. The motor 11 further includes a squirrel cage or secondary winding 13 which is carried by the rotor and which reacts with the armature winding 12 to give starting and accelerating torque to the motor. The rotor also carries a field winding 14 to which field excitation is applied when the rotor comes up to proper speed.

For supplying power to the motor 11, a source of three-phase alternating current is utilized which is connected to the windings 12 by means of a power line 15. A line switch 16 in this line controls the starting and stopping of the motor. This switch has been shown as manually operated though it can be readily comprehended that any well-known electroresponsive or automatic means may be employed.

For supplying excitation to the field winding 14, a source of direct current is employed which is connected to a direct-current line 18. A field switch 19 is connected in this line, and controls the field excitation of the motor. This switch is operated by means of a coil 21 and is electro-responsive. The field winding circuit is indicated at 30 and comprises two conductors 22 and 23 which lead from the switch 19. The conductor 22 is directly connected to the field winding 14 while the conductor 23 is connected to an adjustable reactance 24. Reactance 24 is connected at 25 to another adjustable reactance 26 which in turn is connected by means of a conductor 27 to the other side of the field winding 14. The purpose of these reactances will be subsequently described in detail.

To prevent excessive voltage in the field winding 14 before the field excitation is applied, a field discharge resistance 28 is employed which is connected in a circuit 29 shunting the field winding 14 during starting. In this circuit is connected a switch 31 which is also operated by the coil 21. This switch is normally closed and opens when the field switch 19 is closed. While the motor is being brought up to speed, discharge resistance 28 is in series with the field winding 14 and only when the motor is synchronized will this resistance be disconnected.

In the disclosed embodiments of the invention, the apparatus comprising the invention includes two polarized relays 32 and 33 which will now be described in detail.

Relay 32 includes a core 34 which is adapted to attract an armature 35. Armature 35 operates a normally open switch 36 and serves to close this switch when sufficient flux flows through the core 34. On the core 34 is mounted an alternating-current coil 37 and a direct-current coil 38 which are connected as will be subsequently described in detail. The armature 35 is relatively light in weight and a small air gap is provided between said armature and core 34, whereby the relay 32 becomes sensitive and may be made to operate on small variations of current existing during exceedingly short time intervals.

Relay 33 is similar to the relay 32 and has a core 39 which is adapted to attract an armature 41. Armature 41 operates a normally closed switch 42 which is adapted to be opened when sufficient flux flows through the core 39. Armature 41 is somewhat heavier than armature 35 and the air gap of relay 33 is somewhat greater than the air gap of relay 32 whereby the action of relay 33 is more sluggish and a greater amount of current is necessary to actuate the same. On the core 39 of relay 33 is an alternating-current coil 43 and a direct-current coil 44. These coils and the corresponding coils of relay 32 are connected as follows:

Coil 43 is connected at one end to conductor 45 which in turn is connected to conductor 27. The other end of this coil is connected by means of another conductor 46 to the connection 25 between the two reactances 24 and 26. This connection is also connected by means of a conductor 47 to one end of coil 37, the other end of which is connected by means of a conductor 48 to conductor 23 of the field circuit which is connected to the adjustable contact of reactance 24. By means of this construction each of the coils 37 and 43 are connected across a reactance which is at all times in series with the field winding 14 of the motor.

The two direct-current coils 38 and 44 are connected by means of conductors 51, 52, 53 and 54 to a line 55 which is energized by any suitable source of direct current. A low voltage is generally preferred for these coils and a separate source of direct current has been shown for the purpose. If desired, however, current may be taken from the direct-current line 18 and a suitable resistance connected in series to reduce the voltage across these coils to the required amount.

The field switch 19 is operated by the coil 21. This coil is energized by alternating current from a single-phase alternating-current line 56. A conductor 57 connects one side of this line to one end of coil 21. Another conductor 58 connects the other side of this coil to the switch 36 of relay 32. This switch is in turn connected by means of a conductor 59 to switch 42. Switch 42 is directly connected to the line 56 by means of a conductor 61. The switches 36 and 42 and coil 21 are thus connected in series in a circuit formed by the various conductors referred to, which circuit I refer to as the control circuit and which is indicated by the reference numeral 62. When circuit 62 is closed, coil 21 is energized and switch 19 closes while switch 31 opens.

In conjunction with the switch 36, a maintaining or shunting circuit 63 is utilized which maintains control circuit 62 closed. The purpose of this circuit will be specifically pointed out subsequently. This circuit includes a switch 64 which is normally open and which is actuated by the coil 21 and opened and closed with the field switch 19. Maintaining circuit 63 includes a conductor 65 which is connected to switch 64 and to conductor 59 previously referred to. This circuit also includes another conductor 66 which is connected to switch 64 and conductor 58.

In Fig. 2, I have shown a curve which gives the torque of the motor at different displacement angles of the rotor magnetic poles with reference to the stator magnetic poles. From this curve, it will be seen that zero angle occurs when the excited rotor poles are directly opposite the stator poles of opposite polarity. An angle of 45 electrical degrees occurs when the excited rotor poles are 45 degrees ahead (in the generator zone) of the stator poles of opposite polarity, and an angle of 180 electrical degrees occurs when the excited rotor poles are directly opposite the stator poles of like polarity, at which position there are repellent or bucking forces. The motor zone includes 180 to 360 degrees, while the generator zone includes 0 to 180 electrical degrees. It will be noted by reference to Fig. 2 that the synchronizing torque is greatest when the field excitation is applied at rotor displacement angles from 330 to 60 degrees. Also that the synchronizing torque is minimum in the neighborhood of 240 degrees. It therefore becomes highly desirable to apply excitation when the displacement angle is within the limits of 330 to 60 degrees.

When a synchronous motor is started and the field winding is shorted through a discharge resistance, an alternating current in the field winding circuit is induced which diminishes in frequency as synchronism is approached. Such current between 90% of synchronous speed and synchronous speed varies in accordance with the curve $asb$ of Fig. 3 with reference to axis $o-o$. Curve $asb$ represents the flux in cores 34 and 39 of relays 32 and 33 which vary in accordance with the induced field discharge current above referred to. Due to the direct-current coils 38 and 44, a uniform flux component is produced in the cores 34 and 39 which is represented by the distance between the lines $o-o$ and $d-d$. The resultant effect would be to shift the axis of magnetization $o-o$ to the line $d-d$, the actual curve $asb$ not being changed in form. It will thus be seen that the crests of the waves in Fig. 3 are greater on one side of the resultant axis $d-d$ which phenomenon is utilized in my invention.

For the purpose of simplifying the explanation of the operation of the invention it has been assumed that curve $asb$ is the same for both relays though this need not necessarily be true.

The relay 32 is so designed that once its armature 35 has been attracted by core 34, the same will not be released until the flux in said core drops below the values represented by lines $f$ and $g$. Furthermore the armature 35 is so designed that unless a time interval greater than that represented by the distance between the lines $w$ and $x$ occurs during which the flux above referred to exists, the armature will not be released. It will thus be readily seen that when the frequency is such as designated at $i$ or at $q$ the relay will not be released due to the fact that the duration of the releasing value of the flux is insufficient. However, at the frequency indicated by the portion r of the curve, the time interval during which the flux is insufficient to hold the armature and which is represented by the distance between points m and n is considerably greater than the time represented by the distance between the lines w and x. The armature 35 will at such portion of the curve asb be released. Relay 32 is so designed that the armature thereof will not be closed until the flux reaches values larger than represented by lines h and j and continue at such larger values for a period of time substantially the same or slightly greater than for releasing.

Relay 33 is similar to relay 32 and is designed so that the flux must drop below substantially the values represented by lines f and g before the armature will be released. Likewise, this relay is designed so that the flux value for releasing occurs during substantially the same length of time, namely the time represented by the distance between lines w and x. This relay is however designed so that the armature 41 thereof is attracted when the flux reaches a value greater than that represented by the line k and continues for a time slightly greater than that required for relay 32. This is accomplished by making armature 35 light and utilizing a small air gap, and by making armature 41 heavier and utilizing a greater air gap.

My invention operates in the following manner. When the motor stator winding 12 is de-energized both relays 32 and 33 are deenergized and circuit 62 is open through switch 36. Also the switch 19 is open and field winding circuit 30 closed through the discharge resistance 28. When A. C. power is applied to the armature winding 12, current is induced in the squirrel-cage winding 13 and also in the field winding 14. The rotor then commences to rotate and accelerate. This causes the current in the field winding circuit to vary in frequency and value which near synchronous speed is similar to the curve a:b of Fig. 3. This current at the instant of starting is great, and the frequency thereof equal to line frequency so that both armatures 35 and 41 are immediately attracted to the cores 34 and 39. This closes switch 36 but simultaneously opens switch 42 so that control circuit 62 remains open. Both these armatures remain attracted until the speed of the rotor of motor 11 reaches a predetermined value near synchronous speed and at which it becomes possible to apply field excitation to field winding 14 for the purpose of procuring synchronous operation of the motor. At the frequency indicated at q in Fig. 3 the time represented by the distance between w and x is not sufficient to release the armatures of either relay. However at r the time during which the flux is insufficient to hold the armatures attracted is represented by the distance between points m and n which is considerably greater. Both armatures 35 and 41 are now released. This opens switch 36 and closes switch 42. Assume that the relay armatures are released at z. The maximum flux value following point p would be at y, but since this value is less than that represented by k, armature 41 remains released. However armature 35 commences to be re-attracted to core 34 when the flux reaches the value indicated at h and switch 36 is closed after a time interval greater than the distance between w and x has elapsed. Control circuit 62 is now completed and the coil 21 becomes energized which opens switch 31 and closes switches 19 and 64. This disconnects the discharge resistance 28 and applies field excitation to the field winding 14. Due to the fact that a period of time elapses after energization of coil 21 and before closing switch 19, excitation is not applied until some such time as indicated at s. Since it also takes some time to build the excitation current up to the full value, excitation would be complete at point t. However, this is at a rotor displacement angle between 330 and 60 degrees which gives the greatest synchronizing torque. It will become apparent that the maximum torque, which occurs at t is greater than that procured when the motor is synchronized at any other rotor displacement angle from 60 to 330 degrees. The portion of the curve at v represents the direct-current field excitation with the motor synchronized.

To prevent the switch 36 from reopening the control circuit 62 after the coil 21 is energized, the maintaining switch 64 is employed which shunts switch 36. This prevents opening of the circuit 62 until sufficient alternating current again flows in the field winding circuit 30 to energize relay 33.

If at any time the motor pulls out of synchronism due to overload, voltage dip, or any other causes, alternating current would again be induced in the reactances 24 and 26. When the frequency and value of such current would be proper, armature 41 would again be attracted and control circuit 62 opened through switch 42. This would open switch 19 and remove field excitation and reinsert the field discharge resistance. The system would then be in condition for resynchronization permitting repetition of the sequence of operations previously described.

By decreasing the air gap of polarized relay 32, the relay closes its armature 35 at a lesser value of current so that both points p and s shift to the left, thus applying excitation at an earlier point and larger rotor displacement angle in the generator zone. This can readily be accomplished by means of an adjusting screw limiting the outermost position of the armature 35.

In Fig. 4 I have shown a modification of the invention. In this form of the invention a number of the elements are the same and the description of the similar parts of this form of the invention will not be repeated. The same reference numerals will, however, be used to designate like parts.

In the form of the invention shown in Fig. 4, the two reactances 24 and 25 are dispensed with and a single adjustable reactance 124 used in place thereof. The conductors 23 and 27 are in this case connected to the ends of the reactance 124, and the connection 25 and conductor 46 dispensed with. The mode of operation of this form of the invention is identical with that of the system shown in Fig. 1. Adjustment of the relay coils in this case may be made by proportioning the number of turns in each relay coil so that the desired ampere-turn strength is obtained in each polarized relay.

The advantages of my invention are manifest. With my invention, increased synchronizing torque results. At the same time, the current surge at the instant of synchronization is greatly reduced. My invention is adjustable to apply excitation within the most desirable rotor displacement angle limits and functions positively within a few degrees of the desired displacement angle to apply excitation when the proper conditions occur. In the event that the motor pulls out of synchronism, the system is immediately placed in condition for resynchronization.

It will be understood that my invention is not limited to the specific construction shown. To obtain further flexibility in the operative characteristics, taps may be used on the relay coils 37 and 43 so as to vary the number of effective turns. My invention besides being applicable to three-phase systems, is obviously applicable to other polyphase and single-phase systems by suitable changes which can be readily determined by one skilled in the art. If desired the cores of the two relays may be constructed as permanent magnets and the direct-current coils thereof dispensed with.

While theories have been advanced as to operation of my synchronous motor control systems, this has been done with a view of facilitating the explanation thereof and it is to be understood that I do not bind myself to these or any other theories.

It will, of course, be understood that various changes may be made in the form, details, proportions and arrangements of the parts, without departing from the scope of my invention which, generally stated, consists in a device capable of carrying out the objects above set forth and in the novel parts and combination of parts disclosed and defined in the appended claims.

What I claim as new and desire to secure by Letters Patent is:

1. In combination with the field winding of a synchronous motor, an initially closed field discharge circuit therefor, switch means for opening said circuit and applying excitation thereto, a control circuit for actuating said switch means, a relay responsive to a condition of said discharge circuit and controlling a normally closed switch in said control circuit, a second relay responsive to a condition of said discharge circuit and controlling a normally open switch in said control circuit, said relays being released to close said normally closed switch and open said normally open switch when the discharge current and frequency reach certain values, and said second named relay being adapted to be reactuated upon subsequent increase of current therein to complete closing of the control circuit, and means for increasing the strength of the current tending to reactuate said second named relay.

2. In combination with the field winding of a synchronous motor, an initially closed field discharge circuit therefor, switch means for opening said circuit and applying excitation thereto, a control circuit for actuating said switch means, a relay responsive to a condition of said discharge circuit and controlling a normally closed switch in said control circuit, a second relay responsive to a condition of said discharge circuit and controlling a normally open switch in said control circuit, said relays being released to close said normally closed switch and open said normally open switch when the discharge current and frequency reach certain values, said second named relay requiring less current for actuation than said first named relay.

3. In combination with the field winding of a synchronous motor, an initially closed field discharge circuit therefor, switch means for opening said circuit and applying excitation thereto, a control circuit for actuating said switch means, a reactance in said discharge circuit, a relay having a coil connected to said reactance and a second coil connected to a source of direct current, said relay controlling a normally closed switch in said control circuit, a second relay having a coil connected to said reactance and a second coil connected to a source of direct current, said second relay controlling a normally open switch in said control circuit, said relays being released to close said normally closed switch and open said normally open switch when the discharge current and frequency reach certain values, and said second named relay being adapted to be reactuated to reclose said normally open switch before opening of the normally closed switch.

4. In combination with the field winding of a synchronous motor, an initially closed field discharge circuit therefor, switch means for opening said circuit and applying excitation thereto, a control circuit for actuating said switch means, a reactance in said discharge circuit, a relay having a coil connected to said reactance, said relay controlling a normally closed switch in said control circuit, a second relay having a coil connected to said reactance and having a coil connected to a source of direct current, said second relay controlling a normally open switch in said control circuit, said relays being released to close said normally closed switch and open said normally open switch when the discharge current and frequency reach certain values, and said second named relay being adapted to be reactuated to reclose said normally open switch before opening of the normally closed switch.

5. In combination with the field winding of a synchronous motor, an initially closed field discharge circuit therefor, switch means for opening said circuit and applying excitation thereto, a control circuit for actuating said switch means, a relay responsive to a condition of said discharge circuit and controlling a normally closed switch in said control circuit, a second relay responsive to a condition of said discharge circuit and controlling a normally open switch in said control circuit, said relays being released to close said normally closed switch and open said normally open switch when the field discharge current and frequency reach certain values, said second named relay being adapted to be reactuated upon subsequent increase of current therein to complete closing of said control circuit, and a maintaining circuit shunting said normally open switch and controlled by said switch means.

6. In combination with the field winding of a synchronous motor, an initially closed field discharge circuit therefor, switch means for opening said circuit and applying excitation thereto, a control circuit for actuating said switch means, a relay responsive to a condition of said discharge circuit and controlling a normally closed switch in said control circuit, a second relay responsive to a condition of said discharge circuit and controlling a normally open switch in said control circuit, said relays being released to close said normally closed switch and open said normally open switch when the discharge current and frequency reach certain values, the armature of said second named relay being lighter than that of said first named relay whereby said second named relay is reactuated upon subsequent increase of current therein to reclose the normally open switch before opening of the normally closed switch.

7. In combination with the field winding of a synchronous motor, an initially closed field discharge circuit therefor, switch means for opening said circuit and applying excitation thereto, a control circuit for actuating said switch means, a relay responsive to a condition of said discharge circuit and controlling a normally closed switch in said control circuit, a second relay responsive to a condition of said discharge circuit and controlling a normally open switch in said control circuit, said relays being released to open said normally open switch and close said normally closed switch when the discharge current and frequency reach certain values, the air gap of said second named relay being less than that of said first named relay whereby said second named relay is reactuated upon subsequent increase of current therein to reclose the normally open switch before opening of the normally closed switch.

8. In combination with the field winding of a synchronous motor, an initially closed field discharge circuit therefor, switch means for opening said circuit and applying excitation thereto, a control circuit for actuating said switch means, a reactance in said discharge circuit, a relay having a coil energized by said reactance and controlling a normally closed switch in said control circuit, a second relay having a coil energized by said same reactance and controlling a normally open switch in said control circuit, said relays being released to close said normally closed switch and open said normally open switch when the discharge current and frequency reach certain values, and said second named relay being adapted to be reactuated to reclose said normally open switch before opening of the normally closed switch.

9. In combination with the field winding of a synchronous motor, an initially closed field discharge circuit therefor, switch means for opening said circuit and applying excitation thereto, a control circuit for actuating said switch means, two reactances in series in said discharge circuit, a relay having a coil connected across one of said reactances and controlling a normally closed switch in said control circuit, a second relay having a coil connected across said other reactance and controlling a normally open switch in said control circuit, said relays being released to close said normally closed switch and open said normally open switch when the discharge current and frequency reach certain values, and said second named relay being adapted to be reactuated to reclose said normally open switch before opening of the normally closed switch.

10. In combination, a synchronous motor having a field winding, switching means including electroresponsive means for controlling the connections of said field winding, a reactance in series with said field winding, a polarized relay responsive at all times to an electrical condition of said reactance, and another polarized relay responsive to an electrical condition of said reactance, said relays operating said switching means whereby the connections to said field winding are controlled.

11. In combination, a synchronous motor having a field winding, switching means including electroresponsive means for controlling the connections of said field winding, a reactance in series with said field winding, a polarized relay responsive to an electrical condition of said reactance, another polarized relay responsive to an electrical condition of said reactance, said relays operating said switching means whereby the connections to said field winding are controlled, and means controlled by said switching means for completing a maintaining circuit for said electroresponsive means.

12. In combination, a synchronous motor having a field winding, switching means including electroresponsive means for controlling the connections of said field winding, a reactance in series with said field winding, a polarized relay responsive at all times to an electrical condition of said reactance, a normally closed switch operable by said polarized relay, another polarized relay responsive to an electrical condition of said reactance, and a normally-open switch operable by said second named relay, said switches being included in said switching means to control the connections to the said field winding.

13. In combination, a synchronous motor having a field winding, switching means including electroresponsive means for controlling the connections of said field winding, a reactance in series with said field winding, a polarized relay responsive to an electrical condition of said reactance, a normally closed switch operable by said polarized relay, another polarized relay responsive to an electrical condition of said reactance, a normally open switch operable by said second named relay, said switches being included in said switching means to control the connections to the said field winding, and means controlled by the operation of said switching means for completing a maintaining circuit for said electroresponsive means through an auxiliary switch.

EDWIN W. SWANSON.